United States Patent
Clougherty et al.

(10) Patent No.: US 9,985,799 B2
(45) Date of Patent: May 29, 2018

(54) COLLABORATIVE SOFTWARE-DEFINED NETWORKING (SDN) BASED VIRTUAL PRIVATE NETWORK (VPN)

(71) Applicant: Alcatel-Lucent USA, Inc., Murray Hill, NJ (US)

(72) Inventors: Mark M. Clougherty, Chatham, NJ (US); Christopher Alan White, Neshanic Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 58 days.

(21) Appl. No.: 14/478,604

(22) Filed: Sep. 5, 2014

(65) Prior Publication Data

US 2016/0073327 A1    Mar. 10, 2016

(51) Int. Cl.
*H04L 12/46* (2006.01)
*H04L 29/06* (2006.01)
(Continued)

(52) U.S. Cl.
CPC ...... *H04L 12/4641* (2013.01); *H04L 12/4633* (2013.01); *H04L 63/0272* (2013.01);
(Continued)

(58) Field of Classification Search
CPC ..... H04W 12/00; H04W 12/02; H04W 12/04; H04W 12/06; H04W 12/08; H04W 16/16;
(Continued)

(56) References Cited

U.S. PATENT DOCUMENTS 6,738,910 B1    5/2004  Genty et al.
7,277,547 B1 *  10/2007 Delker ............... H04L 63/0272
                                                    380/270
(Continued)

FOREIGN PATENT DOCUMENTS

JP      2015014907 A  *  1/2015
WO   WO-2014026050 A1    2/2014

OTHER PUBLICATIONS

Aoyagi et al., ELA: A Fully Distributed VPN System over Peer-to-Peer Network, Feb. 4, 2005, The 2005 Symposium on Applications and the Internet (SAINT'05), IEEE.*

(Continued)

*Primary Examiner* — Eric Nowlin
(74) *Attorney, Agent, or Firm* — Harness, Dickey & Pierce, P.L.C.

(57) ABSTRACT

A collaborative software-defined networking (SDN) based virtual private network (VPN) communication method includes: establishing, at a wireless access point, a private wireless local area network (WLAN) slice within a first wireless network in response to a request from a first user, wireless resources for the first wireless network being provided by the wireless access point; creating a VPN connection between the private WLAN slice and a second network; granting users access to the private WLAN slice and the VPN connection between the private WLAN slice and the second network; and routing traffic between the users granted access to the private WLAN slice and the VPN connection without transmission of the traffic to the second network through the VPN connection.

17 Claims, 5 Drawing Sheets

(51) Int. Cl.
*H04W 12/04* (2009.01)
*H04W 12/08* (2009.01)
*H04W 48/20* (2009.01)
*H04W 84/12* (2009.01)
*H04W 88/08* (2009.01)

(52) U.S. Cl.
CPC ........ *H04L 63/0281* (2013.01); *H04L 63/101* (2013.01); *H04W 12/08* (2013.01); *H04W 48/20* (2013.01); *H04L 63/065* (2013.01); *H04L 63/104* (2013.01); *H04W 12/04* (2013.01); *H04W 84/12* (2013.01); *H04W 88/08* (2013.01)

(58) Field of Classification Search
CPC . H04W 28/18; H04W 36/0038; H04W 76/02; H04W 76/022; H04W 84/045; H04W 84/12; H04W 88/04; H04W 88/08; H04W 88/085; H04W 92/02; H04W 92/10; H04W 48/04; H04W 48/48; H04L 12/4641; H04L 12/4662; H04L 12/4675; H04L 63/0272; H04L 63/0428; H04L 63/061; H04L 63/062; H04L 63/08; H04L 63/0823; H04L 63/083; H04L 63/101; H04L 63/105; H04L 63/20; H04L 67/42; H04L 61/2592
See application file for complete search history.

(56) References Cited

U.S. PATENT DOCUMENTS

| | | | | |
|---|---|---|---|---|
| 7,310,524 | B2* | 12/2007 | Kurokawa | H04W 88/08 370/352 |
| 7,339,915 | B2* | 3/2008 | Jakkahalli | H04L 12/4645 370/338 |
| 7,389,534 | B1* | 6/2008 | He | H04L 63/0272 713/153 |
| 7,493,084 | B2* | 2/2009 | Meier | H04L 12/4641 340/7.1 |
| 7,535,880 | B1* | 5/2009 | Hinman | H04W 12/08 370/338 |
| 7,542,476 | B2 | 6/2009 | Almog et al. | |
| 7,633,909 | B1* | 12/2009 | Jones | H04L 63/0272 370/338 |
| 7,924,793 | B2* | 4/2011 | Savoor | H04L 41/0896 370/254 |
| 7,974,249 | B2* | 7/2011 | Lo | H04L 63/0272 370/338 |
| 8,032,174 | B2* | 10/2011 | Kezys | H04L 63/0428 370/338 |
| 8,036,195 | B2* | 10/2011 | Thompson | H04L 12/1464 370/338 |
| 8,077,689 | B1* | 12/2011 | Jones | H04L 63/0272 370/338 |
| 8,131,303 | B2* | 3/2012 | Cook | H04M 11/062 370/328 |
| 8,184,530 | B1* | 5/2012 | Swan | H04W 76/022 370/230 |
| 8,428,263 | B2* | 4/2013 | Inada | H04L 63/065 380/255 |
| 8,553,662 | B2* | 10/2013 | Chen | H04W 84/02 370/338 |
| 8,631,471 | B2* | 1/2014 | Dattagupta | H04W 12/08 380/270 |
| 8,929,341 | B2* | 1/2015 | Han | H04W 12/08 370/331 |
| 9,026,121 | B2* | 5/2015 | Cook | H04M 11/062 370/329 |
| 9,125,058 | B2* | 9/2015 | Jones | H04L 63/0272 |
| 9,148,781 | B2* | 9/2015 | Le Sage | H04W 12/02 |
| 9,197,671 | B1* | 11/2015 | Bartoszewski | H04L 41/0813 |
| 9,240,898 | B1* | 1/2016 | Melman | H04L 12/4625 |
| 9,241,367 | B2* | 1/2016 | Chen | H04W 84/02 |
| 9,258,702 | B2* | 2/2016 | Murphy | H04W 12/06 |
| 9,288,842 | B2* | 3/2016 | Yeoh | H04W 8/26 |
| 9,344,161 | B2* | 5/2016 | Kish | H04B 7/0408 |
| 9,473,458 | B2* | 10/2016 | Bartoszewski | H04L 41/0813 |
| 9,591,676 | B1* | 3/2017 | Lopes | H04W 76/02 |
| 9,608,859 | B2* | 3/2017 | Gupta | H04L 41/0663 |
| 9,730,269 | B2* | 8/2017 | Iyer | H04W 84/12 |
| 9,838,369 | B2* | 12/2017 | Ram | H04W 12/08 |
| 9,838,942 | B2* | 12/2017 | Murphy | H04W 40/02 |
| 2002/0004902 | A1* | 1/2002 | Toh | H04L 63/0442 713/170 |
| 2004/0103278 | A1* | 5/2004 | Abhishek | H04L 63/08 713/160 |
| 2004/0266427 | A1* | 12/2004 | Kurokawa | H04W 88/08 455/426.2 |
| 2005/0063400 | A1* | 3/2005 | Lum | H04L 63/20 370/401 |
| 2005/0198306 | A1* | 9/2005 | Palojarvi | H04L 63/0272 709/227 |
| 2005/0220048 | A1* | 10/2005 | Lee | H04L 63/08 370/328 |
| 2006/0039356 | A1* | 2/2006 | Rao | H04L 1/1854 370/352 |
| 2006/0089121 | A1* | 4/2006 | Elgebaly | H04L 63/0272 455/410 |
| 2006/0230446 | A1* | 10/2006 | Vu | H04L 63/166 726/15 |
| 2006/0236378 | A1* | 10/2006 | Burshan | H04L 63/0272 726/4 |
| 2006/0245362 | A1* | 11/2006 | Choyi | H04L 12/4633 370/238 |
| 2007/0081477 | A1* | 4/2007 | Jakkahalli | H04L 12/4645 370/310 |
| 2007/0206527 | A1* | 9/2007 | Lo | H04L 63/0272 370/328 |
| 2008/0117836 | A1* | 5/2008 | Savoor | H04L 41/0896 370/254 |
| 2008/0155678 | A1* | 6/2008 | Ohkubo | H04L 63/102 726/15 |
| 2009/0310535 | A1* | 12/2009 | Anumala | H04W 8/26 370/328 |
| 2010/0154050 | A1* | 6/2010 | Mukkara | H04L 12/4641 726/15 |
| 2010/0182959 | A1* | 7/2010 | Cook | H04M 11/062 370/329 |
| 2010/0202428 | A1* | 8/2010 | Thompson | H04L 12/1464 370/338 |
| 2011/0264730 | A1* | 10/2011 | Dattagupta | H04L 12/2809 709/203 |
| 2012/0002813 | A1* | 1/2012 | Wei | H04L 63/0272 380/270 |
| 2012/0027002 | A1* | 2/2012 | Jones | H04L 63/0272 370/338 |
| 2012/0044914 | A1* | 2/2012 | Chen | H04W 12/08 370/338 |
| 2012/0113977 | A1* | 5/2012 | Shimoosawa | H04L 12/4641 370/352 |
| 2012/0127942 | A1* | 5/2012 | Cook | H04M 11/062 370/329 |
| 2012/0317619 | A1* | 12/2012 | Dattagupta | H04W 12/08 726/4 |
| 2013/0163515 | A1* | 6/2013 | Yeoh | H04W 88/08 370/328 |
| 2013/0201978 | A1* | 8/2013 | Iyer | H04W 84/12 370/338 |
| 2013/0301627 | A1* | 11/2013 | Chen | H04W 12/08 370/338 |
| 2013/0312074 | A1* | 11/2013 | Sarawat | H04W 12/06 726/7 |
| 2014/0233734 | A1* | 8/2014 | Ram | H04W 12/08 380/270 |
| 2014/0254555 | A1* | 9/2014 | Reznik | H04W 16/10 370/331 |

(56) References Cited

U.S. PATENT DOCUMENTS

| | | | | |
|---|---|---|---|---|
| 2015/0117180 A1* | 4/2015 | Gupta | ................ | H04L 41/0663 370/221 |
| 2015/0133099 A1* | 5/2015 | Xu | ................ | H04W 24/02 455/418 |
| 2015/0188940 A1* | 7/2015 | Lapidous | ................ | H04W 12/12 726/15 |
| 2015/0326610 A1* | 11/2015 | Bartoszewski | ................ | H04L 41/0813 726/1 |
| 2015/0350989 A1* | 12/2015 | Himayat | ................ | H04W 36/0066 370/331 |
| 2015/0382196 A1* | 12/2015 | Hillier | ................ | H04W 4/008 726/7 |
| 2016/0006694 A1* | 1/2016 | Bartoszewski | ................ | H04L 41/0813 726/11 |
| 2016/0135108 A1* | 5/2016 | Murphy | ................ | H04W 12/06 370/338 |
| 2016/0173448 A1* | 6/2016 | Olshansky | ................ | H04L 12/4641 726/4 |
| 2016/0277375 A1* | 9/2016 | Ram | ................ | H04W 12/08 |
| 2016/0374078 A1* | 12/2016 | Ghosh | ................ | H04W 16/10 |
| 2017/0086229 A1* | 3/2017 | Lopes | ................ | H04W 76/02 |
| 2017/0086241 A1* | 3/2017 | Lopes | ................ | H04W 76/025 |
| 2017/0142540 A1* | 5/2017 | Shirakata | ................ | H04B 7/0617 |
| 2017/0150362 A1* | 5/2017 | Clemenson | ................ | H04L 41/0806 |
| 2017/0187688 A1* | 6/2017 | Hodroj | ................ | H04L 63/0272 |
| 2017/0272819 A1* | 9/2017 | Zerr | ................ | H04N 21/4753 |
| 2017/0290074 A1* | 10/2017 | Lee | ................ | H04L 61/6022 |
| 2017/0353988 A1* | 12/2017 | Lopes | ................ | H04L 12/4641 |
| 2017/0367127 A1* | 12/2017 | Lopes | ................ | H04W 76/02 |

OTHER PUBLICATIONS

Deri et al., N2N: A Layer Two Peer-to-Peer VPN, Jul. 3, 2008, 2008 Proceedings on Second International Conference on Autonomous Infrastructure, Management and Security, Springer Berlin Heidelberg, pp. 53-64.*

W. Ginolas. Aufbau eines virtuellen privaten Netzes mit Peer-to-Peer Technologie. Master's thesis, Aug. 14, 2009, Fachhochschule Wendel, Accessed from http://p2pvpn.org/thesis.pdf on Sep. 22, 2016.*

Wolinsky et al., On the Design of Autonomic Decentralized VPNs, Oct. 12, 2010, 2010 6th International Conference on Collaborative Computing: Networking, Applications and Worksharing.*

Toshihiko et al., Machine Translation of JP2015014907A, Jan. 24, 2017, Patent Translate by EPO and Google.*

Jobongo, How to setup SSID for VPN and SSID for Regular ISP using OpenVPN, Feb. 28, 2013, Github Wiki, https://github.com/RMerl/asuswrt-merlin/wiki/How-to-setup-SSID-for-VPN-and-SSID-for-Regular-ISP-using-OpenVPN (accessed on Oct. 2, 2017).*

* cited by examiner

COLLABORATIVE SOFTWARE-DEFINED NETWORKING (SDN) BASED VIRTUAL PRIVATE NETWORK (VPN)

BACKGROUND

Employees often utilize virtual private network (VPN) connections when working off-site. Conventionally, each individual employee uses a separate VPN client to establish a separate VPN connection that terminates at an enterprise location, such as a VPN server on an enterprise network at a company's home location. In this case, all traffic, including traffic sent between the employees' devices, must travel through the enterprise network even when the two or more employees are located at the same location and attached to the same wireless network. Data travels from one employee's client device to the connection endpoint at the enterprise network, is routed through the enterprise network, and then to the second employee's client device. This may result in significant latency in communication between these client devices as well as the utilization of enterprise and local backhaul resources for what essentially amounts to local traffic.

SUMMARY

Example embodiments enable multiple users to collaborate at a remote, off-site location as if their devices were located securely within an enterprise network firewall, but with latency and bandwidth consistent with being located within the same local area network (LAN) or wireless LAN (WLAN). For example, employees of company X are able to connect their computers (or other client devices) to a locally provided wireless access point providing a WiFi connection to the Internet. Through an authentication process the wireless access point creates a private WLAN slice, and the private WLAN slice is connected to the enterprise through a VPN connection (e.g., through a VPN tunnel). Any data transmitted between the users at the remote location may be performed more efficiently and/or securely within this private WLAN slice, while not being exposed to any other devices connected to the wireless access point.

Any data transmitted to the enterprise network utilizes the VPN connection between the wireless access point and the enterprise network, but traffic transmitted between the co-located users need not be transmitted from the users' location to the enterprise network and then back to the users' location as is the case in the conventional art.

At least one example embodiment provides a method for communicating via a collaborative software-defined networking (SDN) based virtual private network (VPN), the method including: establishing, at a wireless access point, a private wireless local area network (WLAN) slice within a first wireless network in response to a request from a first user, wireless resources for the first wireless network being provided by the wireless access point; creating a VPN connection between the private WLAN slice and a second network; granting users access to the private WLAN slice and the VPN connection between the private WLAN slice and the second network; and routing traffic between the users granted access to the private WLAN slice and the VPN connection without transmission of the traffic to the second network through the VPN connection.

At least one other example embodiment provides a wireless access point to establish and provide communication between users via a collaborative software-defined networking (SDN) based virtual private network (VPN). The wireless access point includes a wireless communication interface and a SDN processor. The wireless communication interface is configured to provide wireless resources for a first wireless network. The SDN processor is configured to: establish a private wireless local area network (WLAN) slice within the first wireless network in response to a request from a first user; grant users access to the private WLAN slice and a VPN connection between the private WLAN slice and a second network, the VPN connection being associated with the private WLAN slice; and route traffic between the users granted access to the private WLAN slice and the VPN connection without transmission of the traffic to the second network through the VPN connection.

At least one other example embodiment provides a tangible and/or non-transitory computer-readable storage medium including computer executable instructions that, when executed by a processor or computer device, cause the processor or computer device to perform a method for communicating via a collaborative software-defined networking (SDN) based virtual private network (VPN). According to at least this example embodiment, the method includes: establishing, at a wireless access point, a private wireless local area network (WLAN) slice within a first wireless network in response to a request from a first user, wireless resources for the first wireless network being provided by the wireless access point; creating a VPN connection between the private WLAN slice and a second network; granting users access to the private WLAN slice and the VPN connection between the private WLAN slice and the second network; and routing traffic between the users granted access to the private WLAN slice and the VPN connection without transmission of the traffic to the second network through the VPN connection.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
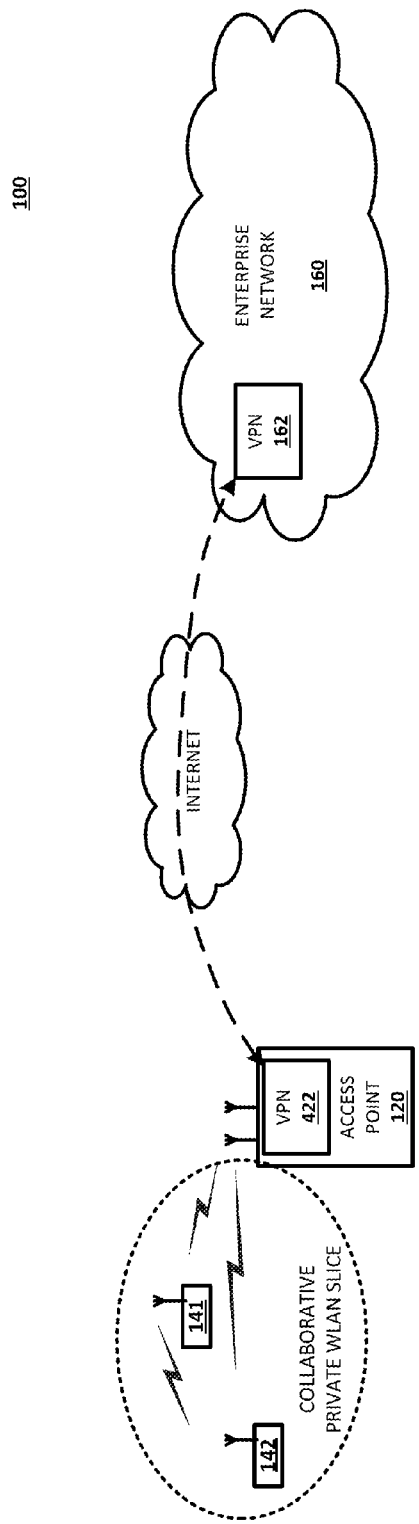
FIG. 1 illustrates a communications network according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing wireless access points, wireless routers, wireless gateways, client devices, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

According to example embodiments, wireless access points, wireless routers, servers, client devices, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

FIG. 1 illustrates a communications network according to an example embodiment.

Referring to FIG. 1, the communications network 100 includes a wireless access point 120 in communication with a virtual private network (VPN) server or gateway (hereinafter referred to as VPN server) 162 located on an enterprise network 160 through the Internet. Although FIG. 1 illustrates the wireless access point 120 in communication with the VPN server 162 via the Internet, example embodiments should not be limited to this example. Rather, the wireless access point 120 may communicate with the VPN server 162 via any number of networks (e.g. packet and/or circuit switched), including both wired and wireless networks, cellular networks, etc.

As is known, an enterprise network is a private computer network or intranet interconnecting various computer devices to share computer resources. In some cases, an enterprise network interconnects computers at one or more company sites to share computer resources.

A VPN server, such as VPN server 162, provides access to the enterprise network 160 through a VPN connection, such as a VPN tunnel or the like.

A VPN connection is created by establishing a virtual point-to-point connection between a remote client device (e.g., a VPN client at a wireless access point, a VPN client at a client device, etc.) and the VPN server 162. In one example, the virtual point-to-point connection may be established using a tunneling protocol to create a VPN tunnel. Because tunneling protocols and VPN tunnels, as well as VPN connections in general, are well-known, a more detailed discussion is omitted.

In some cases, a VPN connection is used to extend a private enterprise network across a public network, such as the Internet. A VPN connection enables computers to send/receive data, and function as if directly connected to the private enterprise network, even when located geographically remote from to the actual location of the private enterprise network. A VPN also allows computers to benefit from the functionality, security and management policies of the private enterprise network while not actual present at the location of the private enterprise network.

Referring back to FIG. 1, the wireless access point 120 provides WiFi resources for client devices (e.g., client devices 141 and 142) in range of and attached to the wireless access point 120. The wireless access point 120 allows wireless client devices (e.g., electronic devices having a WiFi transceiver) to connect to other (e.g., wired) networks, such as the Internet.

As discussed herein, the term client device may be considered synonymous to, and may hereafter be occasionally referred to, as user device, client, access terminal, etc., and describes a remote user of wireless resources provided by the wireless access point. In one example, a client device may be a smartphone, a laptop computer, a tablet computer, or any other device having WiFi capabilities such that the device is capable of at least connecting to the wireless access point and accessing the Internet or other network.

Generally, as discussed herein, the wireless access point 120 may be any well-known wireless access point, router, or other physical computer hardware system, including one or more processors, various communication interfaces (e.g., both wireless and wired), a computer readable medium, etc. The one or more interfaces may be configured to transmit/receive data signals via a wireless connection over WiFi to/from one or more other devices, and also communicate with the Internet, for example over a wired connection.

In addition to the operations and functionality discussed herein, the wireless access point 120 may also have all conventional functionality known in the art. For example, the wireless access point 120 may have all conventional functionality found in wireless routers used by Internet Service Provider (ISP) customers to establish wireless LANs at customer premises.

Figure 4:
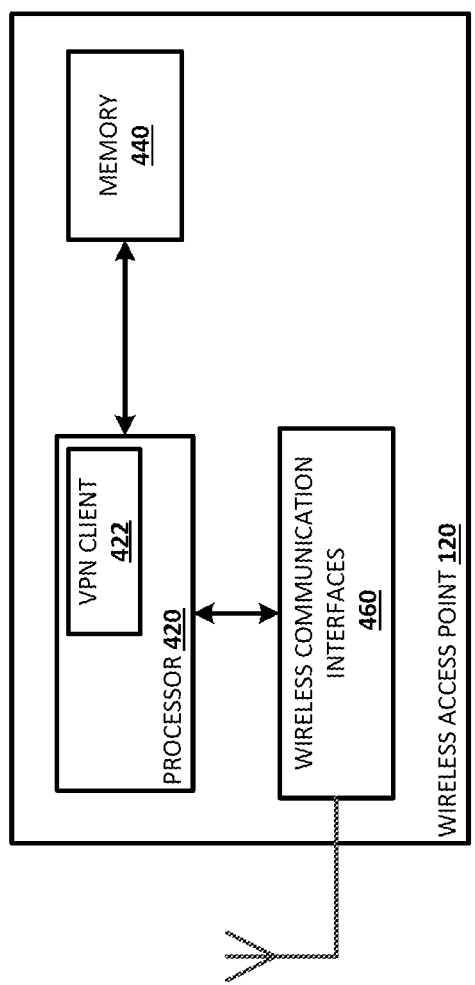
FIG. 4 is a block diagram illustrating an example embodiment of a wireless access point.

FIG. 4 is a block diagram illustrating an example embodiment of the wireless access point 120 in more detail.

Referring to FIG. 4, according to at least this example embodiment the wireless access point 120 includes: a processor 420 (also referred to as SDN processor 420); a memory 440; and one or more wireless communication interfaces 460. The processor 420 includes a VPN client 422, and is operatively coupled to the memory 440 and the wireless communication interfaces 460.

In accordance with at least this example embodiment, the wireless communication interfaces 460 may include a WiFi transceiver configured to communicate with wireless devices using 2.4 GHz UHF and 5 GHz SHF radio waves. The wireless communication interfaces 460 may transmit and receive wireless signals according to one or more Institute of Electrical and Electronics Engineers' (IEEE) 802.11 standards. The wireless communication interfaces 460 may also provide the wireless resources for the users in range of the wireless access point 120. However, example embodiments should not be limited to these examples.

Example operation of the wireless access point 120 and the network 100 shown in FIG. 1 will be discussed in more detail with regard to the flow chart shown in FIG. 3.

Figure 3:
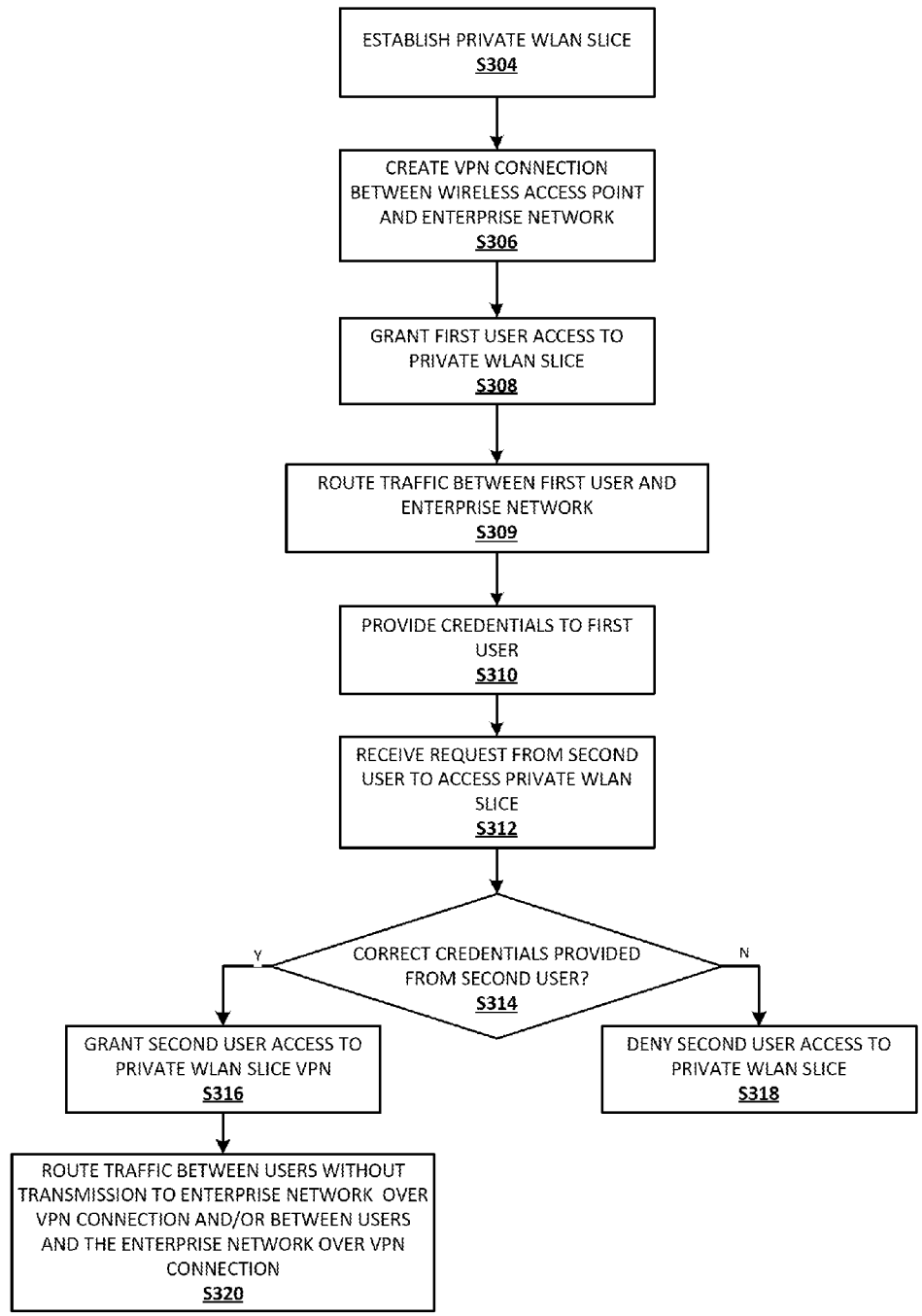
FIG. 3 is a flow chart illustrating an example embodiment of a method for establishing, controlling and utilizing a collaborative software-defined networking (SDN) based virtual private network (VPN).

FIG. 3 is a flow chart illustrating an example embodiment of a method for establishing, controlling and utilizing a collaborative software-defined networking (SDN) based virtual private network (VPN). The method shown in FIG. 3 may also be referred to as a method for establishing a communicating via a collaborative software-defined networking (SDN) based virtual private network (VPN). In yet another alternative, the method shown in FIG. 3 may be referred to as a collaborative software-defined networking (SDN) based virtual private network (VPN) communication method.

Referring to FIG. 3, at step S304 the wireless access point 130 establishes a private WLAN slice in response to a request to establish the private WLAN slice from a first user at client device 141.

A private WLAN slice is a private (secured) virtual network (or virtual network slice) within a larger WLAN, such as the WLAN provided by the wireless access point 120. This virtual network allows devices belonging to the private WLAN slice to have full layer 2 (L2) communication among themselves, but be isolated from other client devices on the WLAN. Conceptually, a private WLAN slice may be considered a VLAN within the WLAN that provides an isolated broadcast domain for devices belonging to the private WLAN slice.

In more detail with regard to step S304 in FIG. 3, when the client device 141 is within range of the wireless access point 120, the client device 141 connects to the wireless access point 120 by establishing a WiFi connection with the wireless access point 120 in any well-known manner. Upon connecting to the wireless access point 120, the client device 141 may present the first user with a web portal (e.g., when the first user opens a web browser on the client device 141). According to at least some example embodiments, the web portal may be provided by the wireless access point. Alternatively, the web portal may be provided by a larger wide area network (WAN) including the wireless access point. In this example, the WAN may utilize software defined networking (SDN) to configure the wireless access point as necessary.

Through the web portal at the client device 141, the first user requests that (or, alternatively, instructs) the wireless access point 120 establish a private WLAN slice for a VPN connection between the wireless access point 120 and the enterprise network 160. In response to the request to establish the private WLAN slice, the wireless access point 120 prompts the first user for VPN information and/or access credentials required to establish the VPN connection between the wireless access point 120 (and private WLAN slice) and the enterprise network 160. In one example, the VPN information and/or access credentials may include address information (e.g., Internet Protocol (IP) or web address) for the VPN server 162 as well as user access credentials (e.g., username, password, one-time personal identification number (PIN), etc.) for accessing the enterprise network 160 through the VPN server 162.

The first user enters the requested information into the web portal provided at the client device 141, and the client device 141 sends the requested information to the wireless access point 140 over the WiFi connection between the client device 141 and the wireless access point 120. In response to the information from the client device 141, the wireless access point 120 establishes the private WLAN slice at step S304.

The wireless access point 120 may establish and manage private WLAN slices in various ways. In one example, the wireless access point 120 establishes the private WLAN slice using an access control list (ACL). In this example, if the wireless access point 120 uses internal virtual LANs (VLANs) to isolate traffic, the wireless access point 120 establishes the private WLAN slice by creating an ACL identifying members of the VLAN (or private WLAN slice). The wireless access point 120 then sets up rules to identify client devices as members of the private WLAN slice based on media access control (MAC) or IP address used to request access to the private WLAN slice. Once authorized, the wireless access point 120 sets up a filter to mark all traffic to/from that client device as belonging to the private WLAN slice. When referring to network traffic, ACLs are used to filter traffic based on full or partial matches of data fields of the packets transmitted over the wireless network. Data fields used in ACLs may include: source MAC address, destination MAC address, source IP address, destination IP address, Transport Control Protocol/User Datagram Protocol (TCP/UDP) port (source and/or destination), as well as other higher layer protocol information. This matching determines whether packets are accepted or dropped by the network function.

In another example, the wireless access point 120 may establish private WLAN slices using a separate service set identifier (SSID) to identify members of the private WLAN slice. In this example, client devices seeking access to the private WLAN slice connect to the slice using the SSID created for the private WLAN slice. Once authenticated (e.g., using a password), any client device connected to that SSID becomes a member of the private WLAN slice. The SSID for the private WLAN slice is different from the SSID associated with the larger WLAN provided by the wireless access point 120.

Returning to FIG. 3, after the wireless access point 120 establishes the private WLAN slice, at step S306 the wireless access point 120 establishes (or creates) a VPN connection between the wireless access point 120 and the enterprise network 160 using the VPN information and access credentials provided by the first user at the client device 141 when requesting the private WLAN slice. In so doing, the wireless access point establishes a VPN connection between the private WLAN slice and the enterprise network 160. The wireless access point 120 may establish the VPN connection in any well-known manner. In one example, the VPN client 422 at the wireless access point 120 establishes a VPN tunnel between the wireless access point 120 and the VPN server 162 by authenticating (using the VPN access credentials provided by the first user) and exchanging encryption keys with the VPN server 162 to establish an encrypted session between the wireless access point 120 and the VPN server 162. Because methods for establishing/creating/setting up VPN connections such as these are well-known a more detailed discussion is omitted.

Although example embodiments are, in most cases, discussed with regard to a VPN connection between the wireless access point 120 and the enterprise network 160, it should be understood that this also refers to a VPN connection between the private WLAN slice and the enterprise network 160. In other words, the VPN connection between the wireless access point 120 and the enterprise network 160 may also be characterized as a VPN connection between the private WLAN slice and the enterprise network 160.

Still referring to FIG. 3, after establishing the private WLAN slice and VPN connection, the wireless access point 120 grants the client device 141 access to the private WLAN slice and the VPN connection at step S308. In one example, the wireless access point 120 grants the client device 141 access to the private WLAN slice by adding the client device 141 to the ACL associated with the private WLAN slice. In another example, the wireless access point 120 joins the client device 141 to the private WLAN slice having the SSID associated with the private WLAN slice. Once having been granted access to the private WLAN slice, the wireless access point 120 establishes a secure and private connection between the client device 141 and the enterprise network 160. Through this connection, the client device 141 is able to access the enterprise network 160, including all known functionality associated with a VPN connection to an enterprise network.

After granting the client device 141 access to the private WLAN slice and the VPN connection, the wireless access point 120 begins routing traffic between the client device 141 and the enterprise network 160 over the secure and private connection between the client device 141 and the enterprise network 160.

Still referring to FIG. 3, at step S310 the wireless access point 120 generates and/or provides access credentials for the private WLAN slice and VPN connection to the first user at the client device 141. The access credentials provided to the client device 141 are credentials to be used by other users and client devices to access the private WLAN slice and established VPN connection. In one example, the access credentials may be the name of the private WLAN slice and password to access the private WLAN slice, the SSID and password for the private WLAN slice, a randomly generated character string, etc. The wireless access point 120 may provide the access credentials to the first user via a web portal at the client device 141. The wireless access point 120 also stores the access credentials for the private WLAN slice in the memory 440, for example, in the form of a lookup table.

After the wireless access point 120 establishes the private WLAN slice and VPN connection, other users and client devices, such as a user at client device 142, may access the private WLAN slice and VPN connection using the access credentials provided at step S310. In this regard, once granted access to the private WLAN slice, the users and client devices are also able to access the established VPN connection between the wireless access point 120 and the enterprise network 160 in the same manner as the client device 141. Controlling access of additional users and client devices to the established private WLAN slice will be discussed in more detail below with regard to the client device 142 shown in FIG. 1 and the additional portions of the flow chart shown in FIG. 3.

Returning to FIG. 3, at step S312 the client device 142 requests access to the established private WLAN slice.

For example, when the client device 142 is within range of the wireless access point 120, the client device 142 connects to the wireless access point 120 by establishing a WiFi connection with the wireless access point 120 in any well-known manner. After connecting to the wireless access point 120, the client device 142 may present the user of the device (hereinafter sometimes referred to as the second user) with a web portal. In one example, the second user opens a web browser on the client device 142 and navigates to the web address of the web portal to access the web portal. In another example, if an SSID is used to identify the private WLAN slice, then the act of attaching to the SSID for the private WLAN slice informs the wireless access point 120 that the second user desires access to the slice. In this example, the second user may be automatically directed to the web portal after connecting to the wireless access point 120.

Through the web portal at the client device 142, the second user requests access to the established private WLAN slice by entering the access credentials provided to the first user at step S310. In one example, the second user at the client device 142 may request access to the private WLAN slice by entering, into the web portal, the name and associated password for the established private WLAN slice.

If an SSID is used to establish the private WLAN slice, then the second user need not input the SSID to identify the private WLAN slice since the use of the SSID indicates the private WLAN slice to which the second desires access. In this case, the second user may only need to provide a password to access the private WLAN slice.

The wireless access point 120 may also request VPN credentials from the second user at the client device 142.

The second user enters the requested information into the web portal provided at the client device 142, and the client device 142 sends the requested information to the wireless access point 140 over the WiFi connection between the client device 142 and the wireless access point 120.

At step S314, the wireless access point 120 compares the access credentials from the client device 142 with the access credentials for the private WLAN slice stored in the memory 440, and provided to the client device 141 at step S310.

If the credentials from the client device 142 match the access credentials for the established private WLAN slice, then the wireless access point 120 grants the client device 142 access to the private WLAN slice and VPN connection at step S316.

Once having granted the client device 142 access to the private WLAN slice and the VPN connection, the wireless access point 120 establishes a secure and private connection between the client devices 141 and 142, as well as between each of the client devices 141 and 142 and the enterprise network 160. As a result, the wireless access point 120 is able to route traffic between (e.g., directly between) the client device 141 and the client device 142 without transmitting the traffic to the enterprise network through the VPN connection. The wireless access point 120 is also able to route traffic between the client devices 141 and 142, as well as between each of the client devices 141 and 142 and the enterprise network 160 through the VPN connection.

Returning to step S314 in FIG. 3, if the access credentials from the client device 142 do not match the access credentials for the established private WLAN slice, then the wireless access point 120 denies the client device 142 access to the private WLAN slice and VPN connection at step S316. In this case, the client device 142 is not able to access the established private WLAN slice or the associated VPN connection between the private WLAN slice and the enterprise network 160.

The example embodiment discussed above with regard to FIGS. 1, 3 and 4 enable multiple users to collaborate at a remote, off-site location as if their devices were located securely within an enterprise network firewall, but with latency and bandwidth consistent with being located within the same local area network (LAN) or wireless LAN (WLAN).

Figure 2:
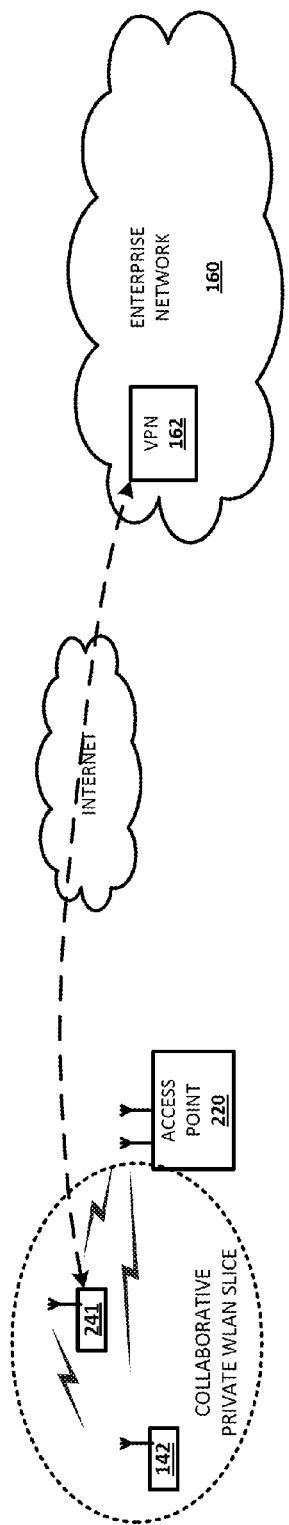
FIG. 2 illustrates a communications network according to another example embodiment.

FIG. 2 illustrates a communications network according to another example embodiment. The example embodiment shown in FIG. 2 is similar to the example embodiment shown in FIG. 1, and thus, only a brief discussion regarding the differences between the example embodiment shown in FIG. 1 and the example embodiment shown in FIG. 2 will be described below.

Referring to FIG. 2, the private WLAN slice is established in the same manner as discussed above with regard to FIGS. 1 and 3, but rather than establishing the VPN connection at the wireless access point 220, a VPN client 522 (see, FIG. 5) at the client device 241 establishes the VPN connection with the VPN server 162. The wireless access point 220 in FIG. 2 is the same or substantially the same as the wireless access point 120, except in that the VPN client 422 may be omitted. Alternatively the wireless access point 220 may be the same as the wireless access point 120 and include the VPN client 422.

Figure 5:
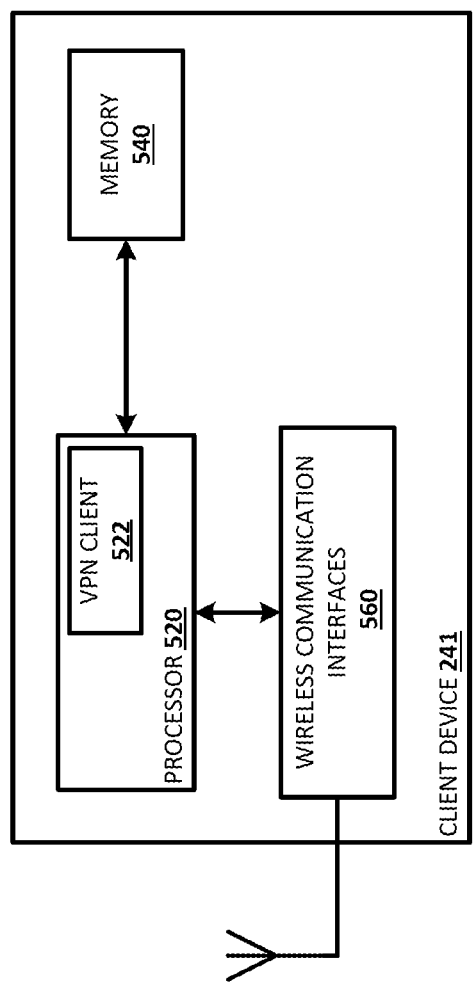
FIG. 5 is a block diagram illustrating an example embodiment of A client device.

FIG. 5 is a block diagram illustrating an example embodiment of the client device 241 shown in FIG. 2.

Referring to FIG. 5, the client device 241 includes: a processor 520; a memory 540; and wireless communication interfaces 560. The processor 520 includes a VPN client 522, and is operatively connected to the memory 540 and the wireless communication interfaces 560.

The wireless communication interfaces 560 may include a WiFi transceiver configured to communicate with wireless devices using 2.4 GHz UHF and 5 GHz SHF radio waves. The wireless communication interfaces 560 may transmit and receive wireless signals according to one or more Institute of Electrical and Electronics Engineers' (IEEE) 802.11 standards. However, example embodiments should not be limited to these examples.

In addition to the operations and functionality discussed herein, the client device 241, as well as the other client devices discussed herein, may also have all conventional functionality known in the art. The client device 241 may be, for example, a portable or other electronic device (e.g., a personal computer, laptop computer, tablet computer, MP3 player, smartphone, etc.

Returning to FIG. 2, the VPN client 522 at the client device 241 may establish the VPN connection in any well-known manner. Thus, in the example embodiment shown in FIG. 2, the VPN connection is established between the client device 241 and the VPN server 162, rather than between the wireless access point 220 and the VPN server 162.

The wireless access point 220 controls access to the private WLAN slice in the same manner as discussed above with regard to FIGS. 1 and 3. If a further client device, such as client device 142, is granted access to the private WLAN slice, the further client device accesses the enterprise network 160 through the VPN connection between the client device 241 and the VPN server 162, rather than through the VPN connection between the wireless access point 220 and the VPN server 162 as in the example embodiment shown in FIG. 1.

One or more example embodiments discussed herein enable multiple users to collaborate at a remote, off-site location as if their devices were located securely within the enterprise firewall, but with latency and bandwidth consistent with being located within the same LAN or WLAN.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for communicating via a collaborative software-defined networking (SDN) based virtual private network (VPN), the method comprising:
    establishing a private wireless local area network (WLAN) slice within a first wireless network provided by a wireless access point, in response to a request from a first user, the first wireless network being identified by a first service set identifier (SSID), and the private WLAN slice being a private virtual network identified by a second service set identifier (SSID);
    creating a VPN connection between the private WLAN slice and a VPN server in a second network;
    granting users access to the private WLAN slice and the VPN connection between the private WLAN slice and the second network; and
    routing traffic between the users without transmission of the traffic to the second network through the VPN connection, wherein the users granted access to the private WLAN slice and the VPN connection include at least the first user and a second user, and wherein the routing step includes, routing traffic associated with at least one of the first and second users among the first user, the second user and the second network, wherein the first SSID is different from the second SSID.

2. The method of claim 1, further comprising:
    establishing an access control list for the private WLAN slice, the access control list identifying users authorized to access the private WLAN slice; and wherein the granting step grants the first user access to the private WLAN slice and the VPN connection by adding a network address for the first user to the access control list.

3. The method of claim 2, wherein the granting step further comprises:
    providing the first user with access credentials for accessing the private WLAN slice;
    prompting the second user for the access credentials in response to a request from the second user to access the private WLAN slice; and
    determining whether to grant the second user access to the private WLAN slice based on credentials provided by the second user in response to the prompting step.

4. The method of claim 3, wherein the determining step comprises:
    granting the second user access to the private WLAN slice if the credentials provided by the second user match the access credentials.

5. The method of claim 4, wherein the granting the second user access comprises:
    adding a network address for the second user to the access control list.

6. The method of claim 1, wherein the routing step routes the traffic directly between the users granted access to the private WLAN slice.

7. The method of claim 1, wherein the creating step comprises:
    establishing, by the wireless access point, the VPN connection between the private WLAN slice and the second network.

8. The method of claim 1, wherein the creating step comprises:
    establishing, by the first user connected to the wireless access point, the VPN connection between the private WLAN slice and the second network.

9. The method of claim 8, wherein:
    the users granted access to the private WLAN slice and the VPN connection include at least the first user and the second user; and
    the routing step routes traffic from the second user to the second network through the VPN connection established by the first user.

10. A wireless access point to establish and provide communication between users via a collaborative software-defined networking (SDN) based virtual private network (VPN), the wireless access point comprising:
    a wireless communication interface configured to provide wireless resources for a first wireless network; and
    a SDN processor configured to,
        establish a private wireless local area network (WLAN) slice within the first wireless network in response to a request from a first user, the first wireless network being identified by a first service set identifier (SSID), and the private WLAN slice being a private virtual network identified by a second service set identifier (SSID),
        grant users access to the private WLAN slice and a VPN connection between the private WLAN slice and a VPN server in a second network, the VPN connection being associated with the private WLAN slice, and
        route traffic between the users without transmission of the traffic to the second network through the VPN connection, wherein the users granted access to the private WLAN slice and the VPN connection include at least the first user and a second user, and wherein the routing step includes, routing traffic associated with at least one of the first and second users among the first user, the second user and the second network, wherein the first SSID is different from the second SSID.

11. The wireless access point of claim 10, wherein the SDN processor is further configured to create the VPN connection between the private WLAN slice and the second network.

12. The wireless access point of claim 10, wherein the SDN processor is further configured to,
   establish an access control list for the private WLAN slice, the access control list identifying users authorized to access the private WLAN slice, and
   grant the first user access to the private WLAN slice and the VPN connection by adding a network address for the first user to the access control list.

13. The wireless access point of claim 12, wherein the SDN processor is further configured to,
   provide the first user with access credentials for accessing the private WLAN slice, and
   determine whether to grant the second user access to the private WLAN slice based on credentials provided by the second user and the access credentials provided to the first user.

14. The wireless access point of claim 13, wherein the SDN processor is further configured to grant the second user access to the private WLAN slice if the credentials provided by the second user match the access credentials.

15. The wireless access point of claim 14, wherein the SDN processor is further configured to grant the second user access to the private WLAN slice by adding a network address for the second user to the access control list.

16. The wireless access point of claim 10, wherein the SDN processor is configured to route the traffic directly between the users granted access to the private WLAN slice.

17. A non-transitory computer-readable storage medium including computer executable instructions that, when executed by a computer device, cause the computer device to perform a method for communicating via a collaborative software-defined networking (SDN) based virtual private network (VPN), the method comprising:
   establishing a private wireless local area network (WLAN) slice within a first wireless network provided by a wireless access point in response to a request from a first user, the first wireless network being identified by a first service set identifier (SSID), the private WLAN slice being a private virtual network identified by a second service set identifier (SSID);
   creating a VPN connection between the private WLAN slice and a VPN server in a second network;
   granting users access to the private WLAN slice and the VPN connection between the private WLAN slice and the second network; and
   routing traffic between the users without transmission of the traffic to the second network through the VPN connection, wherein the users granted access to the private WLAN slice and the VPN connection include at least the first user and a second user, and wherein the routing step includes, routing traffic associated with at least one of the first and second users among the first user, the second user and the second network, wherein the first SSID is different from the second SSID.

* * * * *